(12) United States Patent
Mohammad

(10) Patent No.: US 10,824,988 B2
(45) Date of Patent: Nov. 3, 2020

(54) AUTOMATED INVENTORY MANAGEMENT INCLUDING BLOCKCHAIN SMART CONTRACTING

(71) Applicant: NCR Corporation, Atlanta, GA (US)

(72) Inventor: Jamal Mohiuddin Mohammad, Karimnagar (IN)

(73) Assignee: NCR Corporation, Atlanta, GA (US)

( * ) Notice: Subject to any disclaimer, the term of this patent is extended or adjusted under 35 U.S.C. 154(b) by 153 days.

(21) Appl. No.: 16/117,632

(22) Filed: Aug. 30, 2018

(65) Prior Publication Data

US 2020/0074389 A1 Mar. 5, 2020

(51) Int. Cl.
*G06Q 10/08* (2012.01)
*G06Q 30/06* (2012.01)

(52) U.S. Cl.
CPC ....... *G06Q 10/087* (2013.01); *G06Q 30/0601* (2013.01)

(58) Field of Classification Search
CPC ........ G06Q 40/12; G06Q 40/04; G06Q 10/02; G06Q 20/209; G06Q 20/0856; H04L 9/3247; H04L 9/006; H04L 9/0637
USPC ...................................................... 705/28, 30
See application file for complete search history.

(56) References Cited

U.S. PATENT DOCUMENTS

| | | | |
|---|---|---|---|
| 10,195,513 B2 * | 2/2019 | Tran ..................... | A63B 43/004 |
| 10,226,613 B2 * | 3/2019 | Chelak ................. | A61M 5/1418 |
| 10,361,869 B2 * | 7/2019 | Gorman ................. | H04L 9/3263 |
| 10,438,256 B2 * | 10/2019 | Wollmer ............. | G06Q 30/0619 |
| 10,491,390 B2 * | 11/2019 | Gurkan ................. | H04L 9/0637 |
| 10,498,808 B2 * | 12/2019 | Purushothaman ... | G06K 7/1417 |
| 10,504,179 B1 * | 12/2019 | McGuire ................ | G06Q 40/04 |
| 10,532,268 B2 * | 1/2020 | Tran ........................ | G06F 3/011 |
| 10,534,913 B2 * | 1/2020 | Daniel ................... | G06F 21/645 |
| 10,581,869 B2 * | 3/2020 | Simons ................ | G06F 21/6254 |
| 10,601,598 B2 * | 3/2020 | Finlow-Bates ....... | H04L 9/3247 |
| 10,601,900 B2 * | 3/2020 | Chen ..................... | H04L 9/3239 |
| 10,616,324 B1 * | 4/2020 | Kaddoura ............... | H04L 43/04 |
| 10,630,463 B2 * | 4/2020 | Mankovskii .......... | G06F 21/602 |
| 2018/0144292 A1 * | 5/2018 | Mattingly ............. | G06F 16/903 |
| 2019/0057368 A1 * | 2/2019 | Jain ....................... | G06Q 20/209 |
| 2019/0122278 A1 * | 4/2019 | Wollmer .............. | G06Q 40/025 |
| 2019/0295081 A1 * | 9/2019 | Simon ..................... | G06F 16/27 |
| 2019/0318353 A1 * | 10/2019 | Castinado ........... | G06Q 20/0855 |
| 2019/0378224 A1 * | 12/2019 | Krych .................... | G06Q 10/02 |

(Continued)

*Primary Examiner* — Andrew Joseph Rudy
(74) *Attorney, Agent, or Firm* — Schwegman, Lundberg & Woessner

(57) ABSTRACT

Various embodiments each include at least one of systems, methods, software, and data structures for automated inventory management including blockchain smart contracting. One such embodiment in the form of a method includes maintaining a database of products available for purchase from vendors, receiving a data representation of a purchase request for a desired product from a buying entity, and finding a match between the purchase request and vendor of the desired product. This method may then generate a data representation of a contract between the buying entity and the vendor of the match followed by generating a hash of the data representation of the contract and adding the data representation of the contract and the generated hash to a blockchain data structure. A copy of the block chain data structure may then be stored and forwarded to at least each of the contracting parties.

20 Claims, 4 Drawing Sheets

(56) References Cited

U.S. PATENT DOCUMENTS

2019/0385215 A1* 12/2019 Ferenczi ................ G06Q 40/00
2020/0042960 A1*  2/2020 Cook ..................... H04L 9/006

* cited by examiner

AUTOMATED INVENTORY MANAGEMENT INCLUDING BLOCKCHAIN SMART CONTRACTING

BACKGROUND INFORMATION

Large brick-and-mortar and online retailers store their goods in warehouses to maintain suitable stock to sustain sales, to gain favorable product pricing with larger orders, and for other reasons. However, this makes inventory management more critical. Currently, product reordering is either manual or, if automated, is set with the same supplier for each product, even for commodity products that could otherwise be supplied by any number of manufacturers and sellers. Having people involved in reordering products adds inefficiencies. But at the same time, automating reordering often locks retailers into pricing and purchase terms that may not be the most favorable when reordering is needed.

SUMMARY

Various embodiments each include at least one of systems, methods, software, and data structures for automated inventory management including blockchain smart contracting. One such embodiment in the form of a method includes maintaining a database of products available for purchase from vendors, receiving a data representation of a purchase request for a desired product from a buying entity, and finding a match between the purchase request and vendor of the desired product. This method may then generate a data representation of a contract between the buying entity and the vendor of the match followed by generating a hash of the data representation of the contract and adding the data representation of the contract and the generated hash to a blockchain data structure. A copy of the block chain data structure may then be stored and forwarded to at least each of the contracting parties.

Another method embodiment includes finding a vendor match between a purchase request from a buying entity for a desired product available from a plurality of vendors as represented in data stored in a database and a vendor. This method may then generate a data representation of a contract between the buying entity and the vendor, store a blockchain data structure including the data representation of the contract and a generated hash of the contract, and forward the blockchain data structure to at least the buying entity and the vendor over a network.

A further embodiment, in the form of a system, includes a network interface device, a database storing data of products available for purchase from vendors as received via the network interface device from respective vendors, and a processing unit. The system also includes a memory device storing instructions executable by the processing unit to perform data processing activities. The data processing activities may include receiving, via the network interface device, a data representation of a purchase request for a desired product from a buying entity, and finding a match between the purchase request and vendor of the desired product. The data processing activities may further include generating a data representation of a contract between the buying entity and the vendor of the match, generating a hash of the data representation of the contract, adding the data representation of the contract and the generated hash to a blockchain data structure, and storing the data structure.

DETAILED DESCRIPTION

Figure 1:
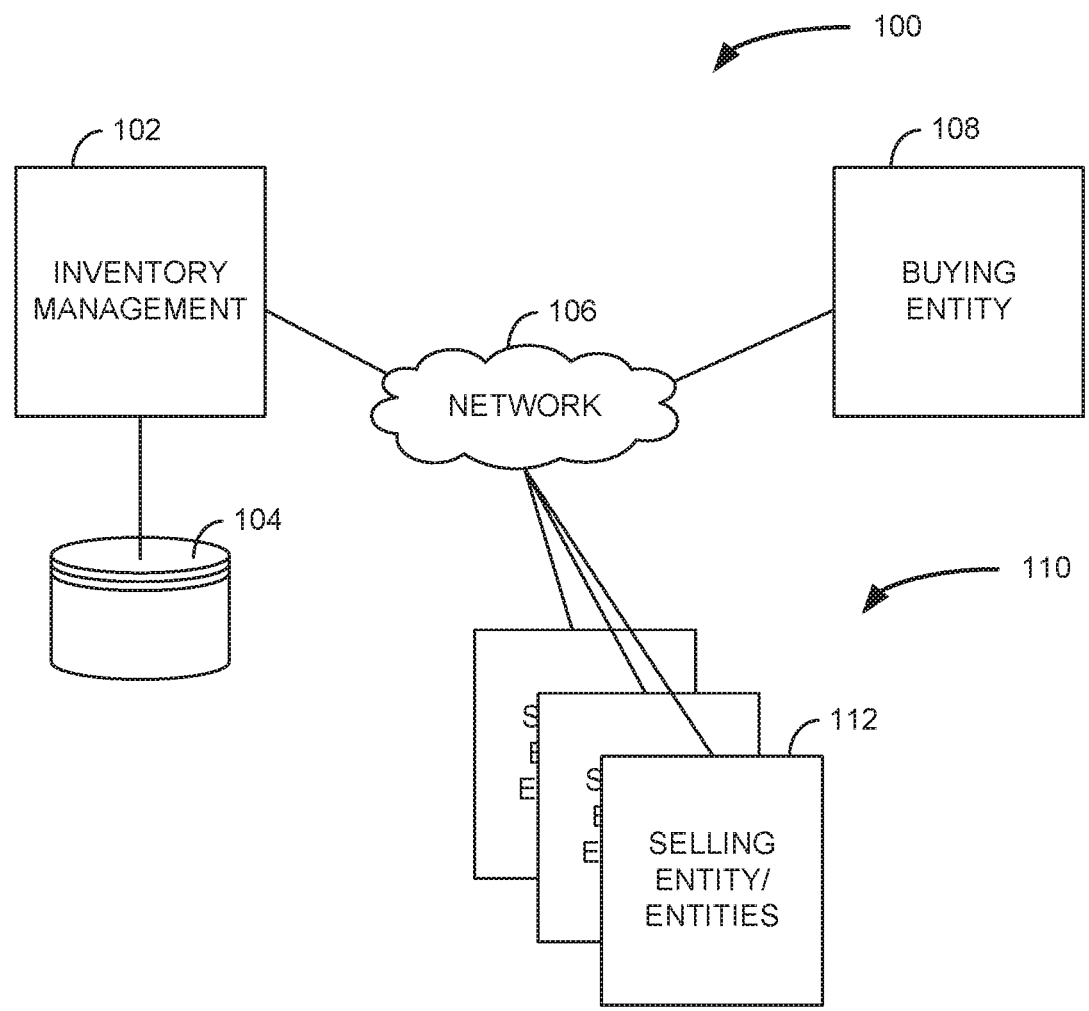
FIG. 1 is a logical block diagram of a system, according to an example embodiment.

Large retailers, both brick-and-mortar and web retailers, commonly store their goods in warehouses and maintain inventories. Existing inventory management systems typical provide notifications when reorder is need so the retailer or other seller can place an order to replenish stock. However, this is still a manual process where the retailer, if not simply reordering from the same supplier, will manually search for a supplier providing the best deal, whether that be pricing, product availability, or other variable or combination of variables that may make one seller better for the retailer in a particular instance.

The various embodiments herein generally use smart contracts built on blockchain methodologies to automatically complete deals and facilitate communication and immediate, machine-verifiable authenticity with the partners all over the world.

Blockchain in these embodiments provides a distributed and immediately verifiable transaction ledger. A blockchain ledger in such embodiments will contain a contract and other documents associated with the transaction, such as bills of lading, proof of origin, evidence of quality or operations performed based purchaser request or requirement, instructions for the place and time of delivery, price, payment evidence, and the like.

In such embodiments, participating sellers share information about the products they are offering for sale on an inventory management platform. At the same time, retailers and other resellers can link their inventory management software with the inventory management platform or otherwise transmit their purchase requests thereto. The retailers or other resellers may have systems that monitor their inventory levels in view of reorder points. When a reorder point is reached, those systems may transmit or otherwise provide a purchase request to the inventory management platform, such as through a web service call, an integration via an application programming interface (API) of the inventory management platform, and the like. A matching of a purchase request with participating seller offers may then be performed and contract may be generated automatically by the system upon a match. A blockchain data structure may then be generated, stored, and provided to at least the parties that are privy to the contract to initiate fulfillment of the contract. As the contract is electronic, the data of the contract can inform other systems to begin automatic fulfillment thereof in some embodiments. In some embodiments, at each subsequent point in execution of the contract a new block is added to the blockchain data structure and the inventory management platform receives the update. In some such embodiments, when the contract has been fully performed, the inventory management platform initiates payment on the contract automatically from an account of the buyer to an account or designate of the seller.

These and other embodiments are described below with reference to the accompanying figures.

In the following detailed description, reference is made to the accompanying drawings that form a part hereof, and in which is shown by way of illustration specific embodiments in which the inventive subject matter may be practiced.

These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 is an example of a computing environment within which some embodiments may be implemented.

The system 100 includes an inventory management platform 102 deployed on a system of one or more servers and stores data in a database 104 attached either logically or physically thereto. The inventory management platform 102 communicates over a network 106 with other entities, such as computing systems of a buying entity 108 and selling entities 110, such as selling entity 112. A buying entity 108 in this instance is an entity that is making a purchase request to the inventory management platform 102 for matching with product sale offers provided to the inventory management platform 102 by the selling entities 112 as discussed above and discussed further below with regard to FIG. 3.

The inventory management platform 102 is deployed on a server computer that includes a network interface device and communicates with a database storing data of products available for purchase from vendors as received via the network interface device from respective vendors, such as one or more selling entities 112. The server also includes a processing unit and a memory device storing instructions executable by the processing unit to perform data processing activities.

The data processing activities in some embodiments may include receiving, via the network interface device, a data representation of a purchase request for a desired product from the buying entity 108 and finding a match between the purchase request and selling entity 112 of the desired product. The data processing activities may further include generating a data representation of a contract between the buying entity and the vendor of the match. The contract may be generated based in part on standardized language agreed upon by the buying entity 108 and selling entities 110 when agreeing to communicate via the inventory management platform 102. The contract may also be generated base in part on common terms between the purchase request and an offer for sale by the selling entity 112.

Figure 2:
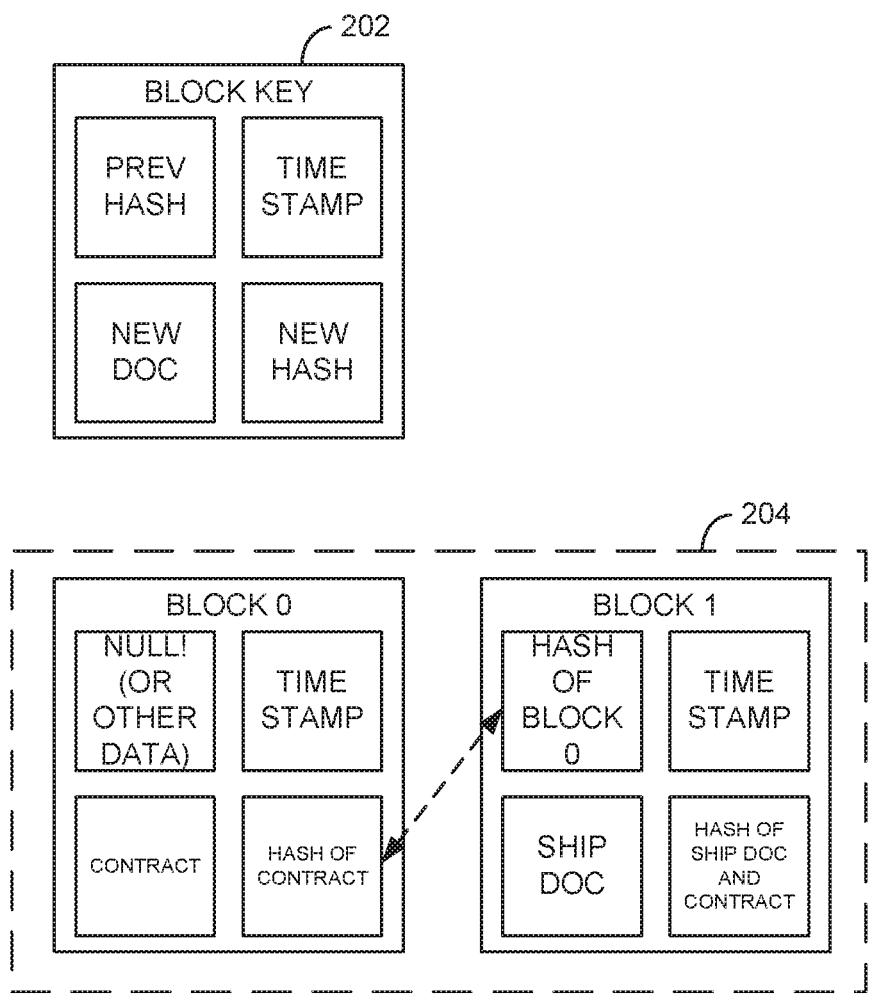
FIG. 2 is a logical data diagram illustration, according to an example embodiment.

The data processing activities may then proceed by generating a hash of the data representation of the contract and adding the data representation of the contract and the generated hash to a blockchain data structure. An example of such a blockchain data structure according to some embodiments is illustrated in FIG. 2. The data processing activities may then conclude by storing, on the memory device, a copy of the blockchain data structure.

FIG. 2 is a logical data diagram illustration, according to an example embodiment. The illustration of FIG. 2 first includes a BLOCK KEY diagram 202 illustrating the basic elements of a block in a block chain data structure. The BLOCK KEY diagram 202 includes four data elements. These data elements include a pervious hash that is the hash of a preceding block in a blockchain, which may be NULL, or have another indicative value, indicating the block is an initial block in a blockchain, such as a for new contractual engagement or an offer for a contract or offer for sale. There is a new document which is what is added by the present block. There is also a new hash which is a hash that generally takes into account the new document added by the block and an immediately prior document or hash thereof. The general principal of the new hash, generated with a private key of a public-private key pair, is that it is based on what is unique to the new block and the previous block such that the hash will provide a unique data element to verify the contents of the previously block and the new block in sequence within the blockchain data structure. The BLOCK KEY diagram 202 also illustrates a time stamp as the last data element. The time stamp is a data and time of when the block was created.

For example, the blockchain data structure 204 includes two blocks, BLOCK 0 and BLOCK 1. BLOCK 0 is the first block and therefore has a NULL!value for the previous block as there is no preceding block and the new document is the contract. The hash value is therefore based just on a hash generated from the contract. A time stamp is also added. Subsequently, BLOCK 1 is added to the blockchain data structure 204. The previous has data element is the hash value from BLOCK 0 and operates as a pointer to the preceding block, thereby chaining BLOCK 1 to BLOCK 0. The document in BLOCK 1 is a shipping document. The hash value is therefore generated based on the new shipping document and either the contract or the hash of the contract from BLOCK 0. The time stamp is also present in BLOCK 1.

Figure 3:
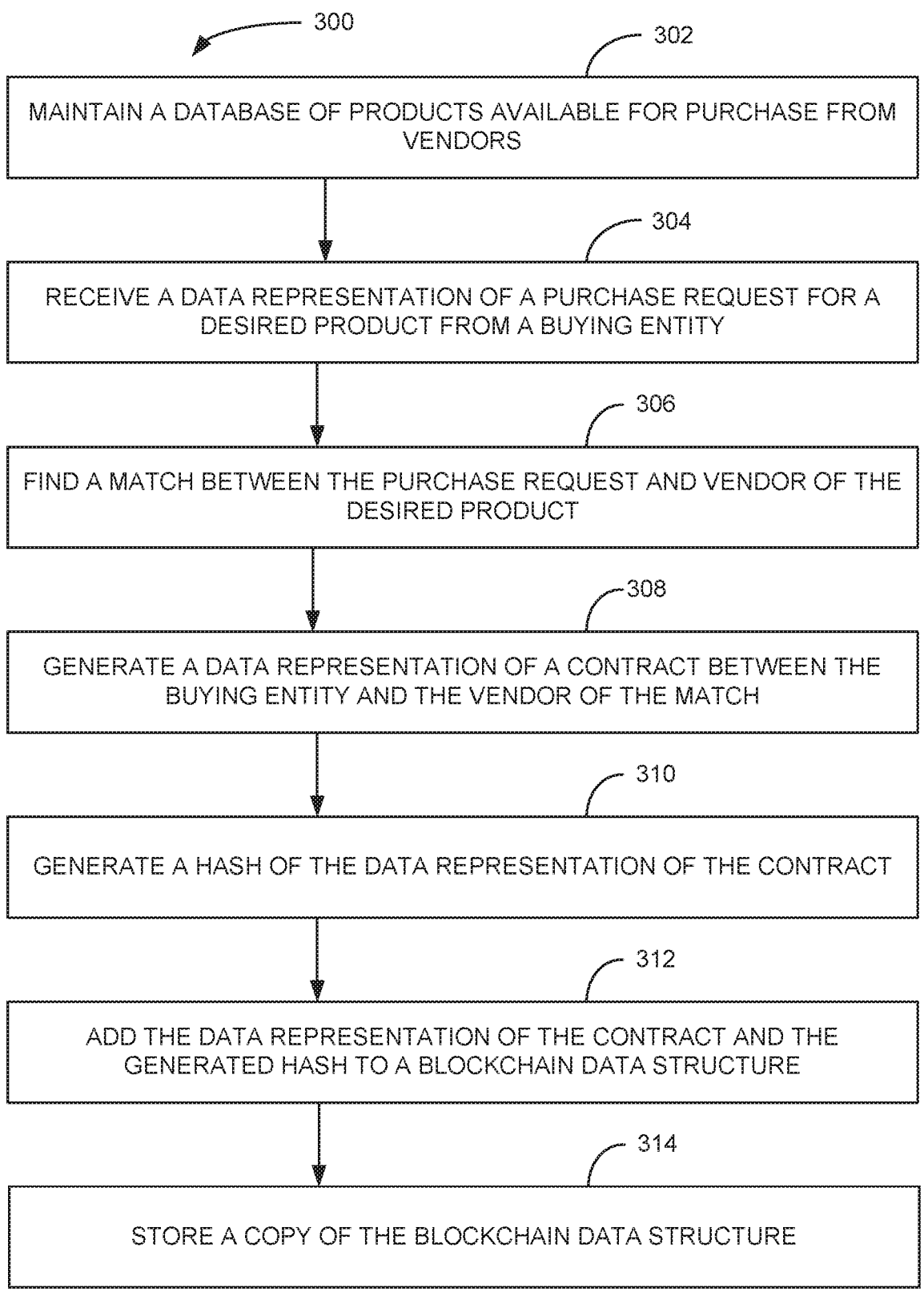
FIG. 3 is a block flow diagram of a method, according to an example embodiment.

FIG. 3 is a block flow diagram of a method 300, according to an example embodiment. The method 300 is an example of a method that may be performed by an inventory management system, such as the inventory management platform 102 system of FIG. 1.

The method 300 includes maintaining 302 a database of products available for purchase from vendors and receiving 304 a data representation of a purchase request for a desired product from a buying entity. The method 300 may then proceed by finding 306 a match between the purchase request and vendor of the desired product and generating 308 a data representation of a contract between the buying entity and the vendor of the match. The method 300 may then generate 310 a hash of the data representation of the contract and add 312 the data representation of the contract and the generated hash to a blockchain data structure, such as the blockchain data structure 204 of FIG. 2. The method may then store 314 the blockchain data structure, such as in a database, and send a copy to at least each party that is privy to the contract and other entities depending the particular contract, such as a shipping company, an financial entity, and the like.

In some embodiments of the method 300, finding 306 the match includes identifying a closest match based on a closest match algorithm.

In another embodiment, the database of products available for purchase from vendors includes data representations of at least one of quantity, availability, and pricing, sale, and shipping terms. In some such embodiments of the method 300, the data representation of the purchase request further includes data identifying a quantity of the desired product, and at least one of pricing, purchase, and shipping terms. Accordingly, the terms of the generated 308 contract may be set according to a quantity of the product being conveyed and pricing, sale, and shipping terms of the matching.

Figure 4:
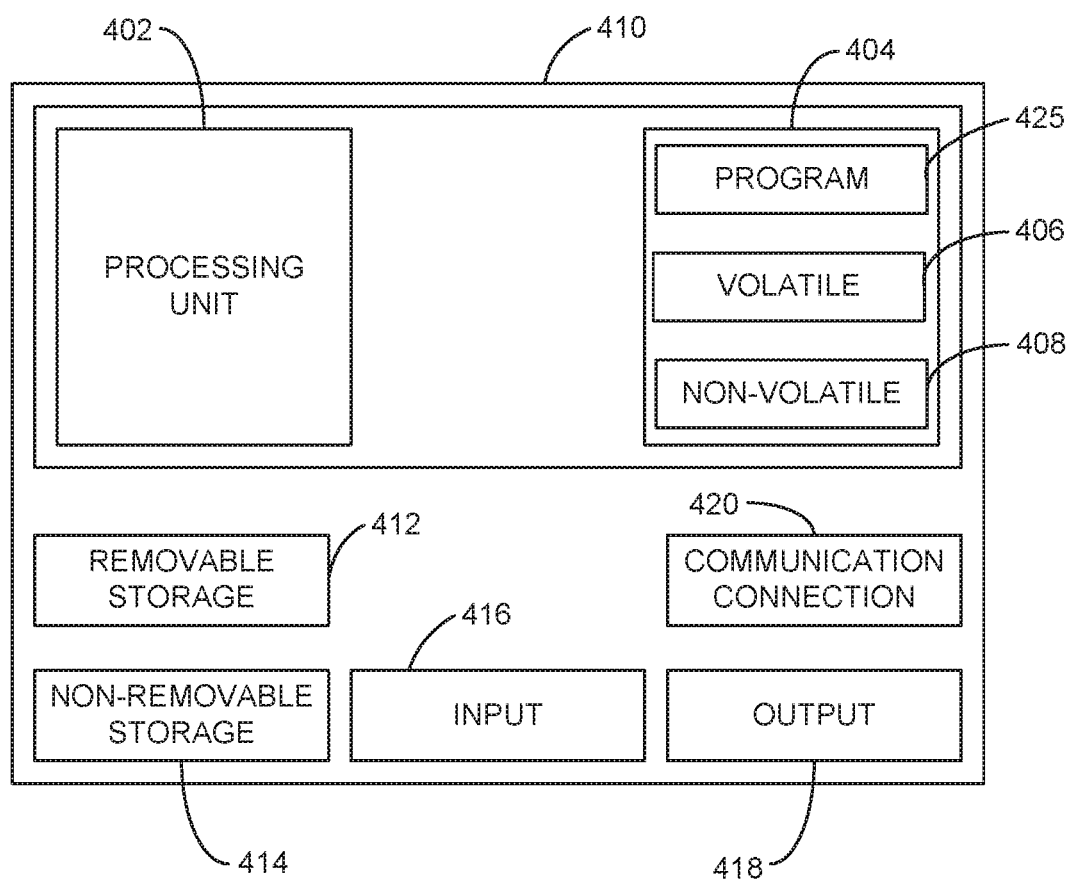
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, smartwatch, or other computing device including the same or similar elements as illustrated and described with regard to FIG. 4. Devices such as smartphones, tablets, and smartwatches are generally collectively referred to as mobile devices. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 410 may include or have access to a computing environment that includes input 416, output 418, and a communication connection 420. The input 416 may include one or more of a touchscreen, touchpad, mouse, keyboard, camera, one or more device-specific buttons, one or more sensors integrated within or coupled via wired or wireless data connections to the computer 410, and other input devices. The computer 410 may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 420 may also or alternatively include a transceiver device, such as a BLUETOOTH® device that enables the computer 410 to wirelessly receive data from and transmit data to other BLUETOOTH® devices.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   maintaining a database of products available for purchase from vendors, the database including a plurality of blockchain data structures defining the products available for purchase;
   receiving a data representation of a purchase request for a desired product from a buying entity;
   finding a match between the purchase request and vendor of the desired product;
   generating a data representation of a contract between the buying entity and the vendor of the match;
   generating a hash of the data representation of the contract;
   adding the data representation of the contract and the generated hash to a blockchain data structure; and
   storing a copy of the blockchain data structure.

2. The method of claim 1, wherein identifying the match includes identifying a closest match based on a closest match algorithm.

3. The method of claim 1, wherein the database of products available for purchase from vendors includes data representations of at least one of quantity, availability, and pricing, sale, and shipping terms.

4. The method of claim 3, wherein the data representation of the purchase request further includes data identifying a quantity of the desired product, and at least one of pricing, purchase, and shipping terms.

5. The method of claim 4, wherein the terms of the contract are set according to a quantity of the product being conveyed and pricing, sale, and shipping terms of the matching.

6. The method of claim 1, wherein the purchase request is received via a network.

7. The method of claim 1, further comprising:
sending, via a network, a copy of the blockchain data structure to at least each party that is privy to the contract.

8. The method of claim 1, wherein the purchase request is received from a monitor process that monitors inventory of the desired product of the purchase request and automatically generates the purchase request when the inventory level reaches a defined restock level.

9. The method of claim 8, wherein the monitor process is executed by the same system that performs the method.

10. A method comprising:
finding a vendor match between a purchase request from a buying entity for a desired product available from a plurality of vendors as represented in data stored in a database and a vendor, the database including a plurality of blockchain data structures defining the products available for purchase;
generating a data representation of a contract between the buying entity and the vendor;
storing a blockchain data structure including the data representation of the contract and a generated hash of the contract; and
forwarding the blockchain data structure to at least the buying entity and the vendor over a network.

11. The method of claim 10, further comprising:
receiving, via a network, a document related to the contract from a third party;
adding a block to the blockchain data structure including a hash of the preceding block, the document related to the contract, and a hash of generated based on a form of both the hash of the preceding block and the document related to the contract;
storing the blockchain data structure; and
forwarding the blockchain data structure to at least the buying entity and the vendor over the network.

12. The method of claim 11, document related to the contract from the third party is a shipping document.

13. The method of claim 11, wherein the document related to the contract from the third party is related to a contract payment.

14. The method of claim 10, wherein:
the database of products available for purchase from vendors includes data representations of at least one of quantity, availability, and pricing, sale, and shipping terms; and
the data representation of the purchase request further includes data identifying a quantity of the desired product, and at least one of pricing, purchase, and shipping terms.

15. The method of claim 14, wherein the terms of the contract are set according to a quantity of the product being conveyed and pricing, sale, and shipping terms of the matching.

16. A system comprising:
a network interface device;
a database storing data of products available for purchase from vendors as received via the network interface device from respective vendors, the database including a plurality of blockchain data structures defining the products available for purchase;
a processing unit;
a memory device storing instructions executable by the processing unit to perform data processing activities comprising:
receiving, via the network interface device, a data representation of a purchase request for a desired product from a buying entity,
finding a match between the purchase request and vendor of the desired product;
generating a data representation of a contract between the buying entity and the vendor of the match;
generating a hash of the data representation of the contract;
adding the data representation of the contract and the generated hash to a blockchain data structure; and
storing, on the memory device, a copy of the blockchain data structure.

17. The system of claim 16, wherein identifying the match includes identifying a closest match based on a closest match algorithm.

18. The system of claim 17, wherein:
the database of products available for purchase from vendors includes data representations of at least one of quantity, availability, and pricing, sale, and shipping terms;
the data representation of the purchase request further includes data identifying a quantity of the desired product, and at least one of pricing, purchase, and shipping terms; and
the terms of the contract are set according to a quantity of the product being conveyed and pricing, sale, and shipping terms of the matching.

19. The system of claim 16, further comprising:
sending, via the network interface device, a copy of the blockchain data structure to at least each party that is privy to the contract.

20. The system of claim 16, wherein:
the purchase request is received from a monitor process that monitors inventory of the desired product of the purchase request and automatically generates the purchase request when the inventory level reaches a defined restock level; and
the monitor process is executed by the system.

* * * * *